C. C. CHENEY.
AUTOMATIC CHECK VALVE FOR COMPRESSED AIR DRILLING MACHINES.
APPLICATION FILED JULY 10, 1918.
1,298,007.
Patented Mar. 25, 1919.
2 SHEETS—SHEET 1.
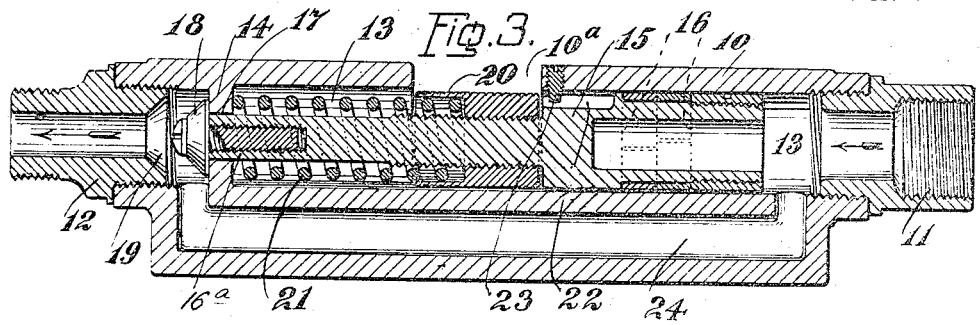
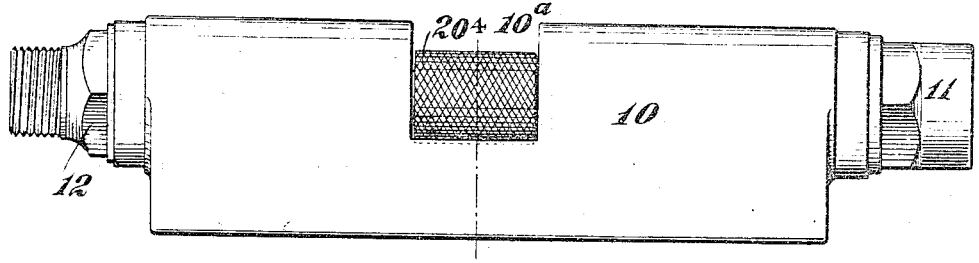
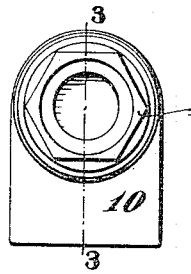
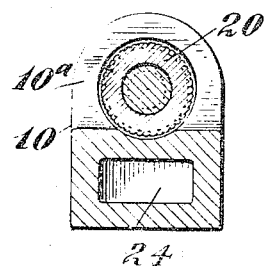
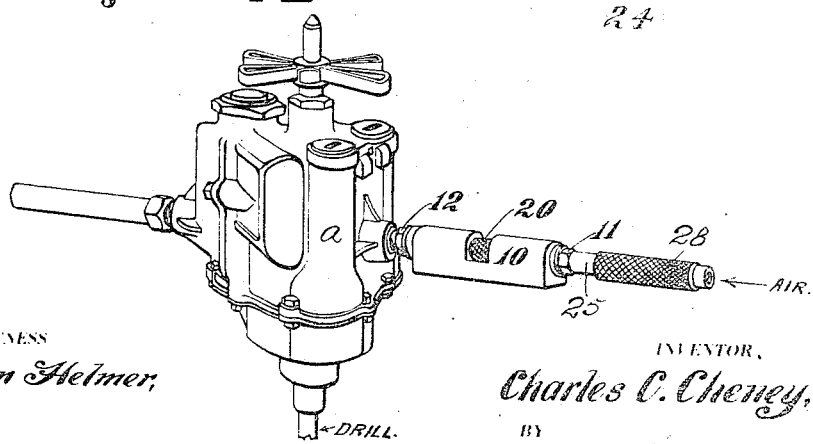
WITNESS
William Helmer,
INVENTOR,
Charles C. Cheney,
BY
Albert Daggett
ATTORNEYS.

C. C. CHENEY.
AUTOMATIC CHECK VALVE FOR COMPRESSED AIR DRILLING MACHINES.
APPLICATION FILED JULY 10, 1918.
1,298,007.
Patented Mar. 25, 1919.
2 SHEETS—SHEET 2.
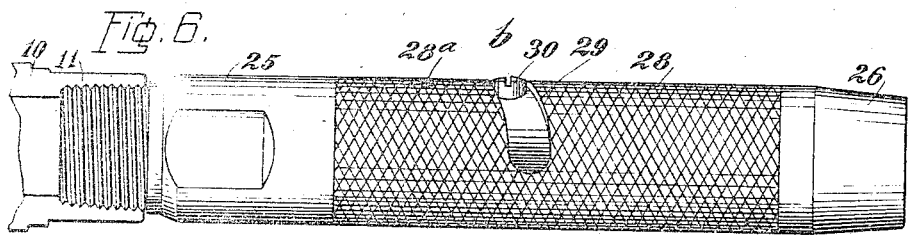
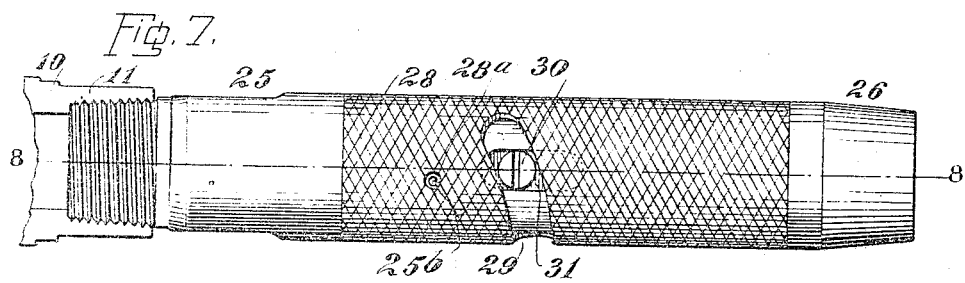
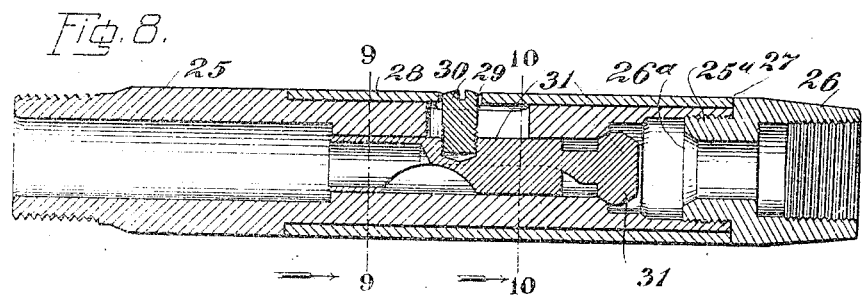
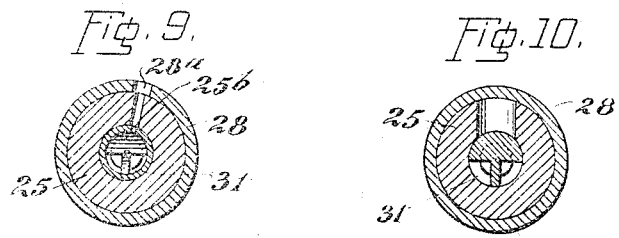
WITNESS
William Helmer.
INVENTOR
Charles C. Cheney,
BY
Allen & Daggett
ATTORNEYS.

UNITED STATES PATENT OFFICE.

CHARLES C. CHENEY, OF CHARLESTOWN, MASSACHUSETTS, ASSIGNOR TO FREDERICK K. DAGGETT, OF BROOKLINE, MASSACHUSETTS.

AUTOMATIC CHECK-VALVE FOR COMPRESSED-AIR DRILLING-MACHINES.

1,298,007.   Specification of Letters Patent.   Patented Mar. 25, 1919.

Application filed July 10, 1918.   Serial No. 244,158.

*To all whom it may concern:*

Be it known that I, CHARLES C. CHENEY, a citizen of the United States, residing at Charlestown, in the county of Suffolk, in the State of Massachusetts, have invented a certain new and useful Improvement in Automatic Check-Valves for Compressed-Air Drilling-Machines, of which the following is a specification, reference being had to the accompanying drawings.

The object of this invention is to provide simple but effective emergency means for automatically and promptly shutting off the air pressure in compressed air drills whenever the drill point encounters a hard spot or for any other reason, is set back by reason of abnormal resistance and, with that desirable end in view, I have provided the annexed drawings in which the Figure 1 is a side view of shut-off mechanism embodying my present improvement and Fig. 2 is an end view of the same. Fig. 3 is a central, longitudinal, sectional, view of said shut-off taken at the line 3—3 of said Fig. 2, and Fig. 4 is a transverse sectional view of same taken at the line 4—4 of the Fig. 1. In Fig. 5 I have shown, by a perspective view, on a relatively reduced scale, a compressed air drill having my emergency device properly located in the air line pipe.

Fig. 6 is an approximately full size side view of the customary live air venting handle and Fig. 7 is a view of the same as seen from the upper side of said Fig. 6.

Fig. 8 is a longitudinal, central, sectional, view of said handle, taken on the line 8—8 of Fig. 7. Figs. 9 and 10 are transverse, sectional, views of the handle taken, respectively, at the lines 9—9 and 10—10 of Fig. 8.

In these drawings the housing of my shut-off device is indicated by the numeral 10 said housing being cored or bored, and tapped, at one end to receive a coupling 11 by means of which the holder may be connected with the compressed air supply and at its outer end the holder is bored and tapped to receive a plug coupling 12 by means of which the holder may be connected with a suitable drill holder. The housing 10 as here illustrated, is cored, or otherwise chambered, throughout the major part of its length, in alinement with the couplings 11 and 12, as seen at 13 in the Fig.1, the said chamber being, however, practically closed at the end adjacent to the coupling 12 by means of a wall 14. Within the chamber 13 is slidably mounted a plunger 15 upon one end portion of which are mounted ring packings 16 which serve to prevent the passage of the compressed air through the chamber 13 but permit the plunger 15 to travel forward and backward in said chamber with reasonable freedom.

The other end portion of said plunger is turned down as at 16ª, to fit easily in an opening 17 in the wall 14, and tapped into the end of said turned down portion is the shank of a valve disk 18 which is located in alinement, but normally out of contact, with a valve seat 19 which is formed in the inner end of the coupling 12 already described.

Screwed upon the turned down portion of the plunger is a knurled adjusting nut 20 which is exposed to view by cutting away the housing 10 as at 10ª. Mounted also upon the turned down portion of the plunger is a stiff spiral spring 21 one end of which abuts the wall 14 and its other end abuts the adjusting nut 20. Spring 21 acts with a constant tendency to force the valve disk 18 away from its seat 19, and the tension of said spring may be readily increased or reduced by properly rotating the nut 20. By preference the plunger is slotted longitudinally, as at 22, to receive the end of a screw 23 which is fixed in the housing; the described slot and screw construction serving both to limit the endwise movement of the plunger and to prevent it from rotating in its seat in the housing.

The numeral 24 denotes a by-pass which provides an unobstructed passage between the open end portion of the chamber 13 and the opening in the coupling 12, when the described valve is normally open, as seen in Fig. 3. The described automatic shut-off device is interposed between the drill chamber *a* and the customary live air venting handle, said venting handle being illustrated in detail in Figs. 6 to 10 of the drawings and consisting essentially of a two-part vented tubular member and a cam-controlled shut-off valve which is slidably mounted in said handle member. The numerals 25 and 26 denote the two parts of the handle, said parts being screw-threaded together at 27; the part 25 being threaded exteriorly as at $25^a$ to screw into the nipple 11 which connects the venting handle with applicant's automatic checking device 10. Rotatably mounted on the venting handle is a milled ferrule 28 which is formed with a diagonal cam slot 29 in which is located the head of a screw 30 that is tapped into the stem of a valve 31 that is slidably mounted in the handle member 25; the arrangement and operation of the last described parts being such that, when the ferrule 28 is partially rotated, the valve 31 will be slid forward until it is seated in the cupped end $26^a$ of the nipple 26 and will thus shut off the flow of air. By the same action a vent opening $25^b$ in the member 25 is caused to register with an opening $28^a$ in the ferrule 28, thus venting the live air and reducing temporarily the pressure in the main air line behind the plunger 15.

The described venting handle and its valve 31 form no part of my present improvement excepting in so far as they coöperate with my automatic shut-off. Ordinarily the quick action of the operator of the machine is relied upon to rotate the ferrule 28, and to thus shut off the air pressure from the drill whenever the drill encounters a hard spot or, for any other reason, meets abnormal resistance, but such manual operation of the shut off is frequently too slow to prevent the breaking of the drill whereas my automatic shut-off operates instantly whenever the drill meets an obstruction. When it is desired to start the drill again it is only necessary to open the valve 31 and close the vent $25^b$ by a partial rotation of ferrule 28 when the flow of air passing, under normal pressure, into the chamber 13, is overcome by spring 21 and the special valve 18 is opened, thus permitting the air to follow the by-pass 24 as first above described by me.

The operation of my improved emergency shut-off is as follows:—So long as the drill encounters no abnormal obstruction the supply of air, under compression, flows freely through the by-pass 24 and through the coupling 12 but, in the event that the tool strikes a hard spot, or other obstruction, and the flow of air is thereby checked, the air pressure is instantly increased in the housing and by-pass and, acting on the plunger 15, forces said plunger forward and thus forces the valve disk 18 into its seat 19 and cuts off the pressure from the coupling 12 and from the drill. As soon, however, as the abnormal resistance is removed from the drill and the air is permitted to pass normally to and through the tool holder, the pressure at the rear end of plunger 15 is reduced and the spring 21 instantly forces the valve disk 18 away from its seat 19 and thus opens the air line again.

My device could obviously also be worked by connecting the fluid pressure supply to the opening 19 opposite the valve 18, and the tool to the nipple 11 opposite the plunger 15, in which case the operation of said regulating device would be resumed automatically, after the abnormal pressure, resulting from the unintentional stopping of the tool, has been relieved, and an additional venting device will become unnecessary. In the practice of my invention I have found it preferable, however, to connect the tool to the valve side, and the fluid pressure supply with the venting handle 28 to the plunger side of the regulator device forming the subject of my invention, as this will prevent the tool from resuming its operation too soon or at an inopportune time, before the cause of the stoppage of the tool has been entirely removed. It is of importance, moreover, for the control of the apparatus to make its operation not dependent upon the back pressure of the fluid supply upon the valve 19.

By placing the spring 21 at the valve end of the regulator between adjustable abutting means 20 of substantially identical diameter with the cavity of the casing, and the abutment-constituting valve end of said casing, I am enabled to vary the operative length of the plunger end 15, and to proportion the spring-and-air cushion created at the valve end of the casing in accordance with the length of the plunger, the stop 23 being placed intermediate the abutment nut 20 and the plunger, acting both as a means of preventing the closing up of the chamber 13, and as a means of limiting the adjustability of the nut 20, and of the cushioning means at the valve end of the casing. The operating fluid retained in the cylindrical depression of the plunger 15 acts as an air cushion preventing the destruction of the stop 23 and excessive thrusts on the different parts of the regulator incident upon the release of the abnormal pressure in the chamber 13 owing to the sudden expansion of the spring-air cushion at the valve end of the device, and it counteracts moreover, the action upon the venting device, and upon the regulator itself which is caused by the suction created by the rapidly rotating movement of the drill borer which is connected to the valve side of the regulator at 12. By providing spring-and-air cushioning means at both ends of the regulator which forms the subject of my invention any tendency of the regulator to stick under abnormal pressure or under abnormal suction is effectually overcome, and a better and easier regulation and control of both the valve end as well as of the plunger end of the device is obtained than would be possible by placing the cushioning means at the plunger end only and by arranging the motion-limiting means 23, 22 intermediate the plunger and the valve the stop is never subjected to the combined action of the full weight of the regulating means and of the air-and-spring cushioning means, but it is only subjected to part of the weight of this portion of the device, and the impact produced on said stop by the operating means on one side of the stem, is counteracted and softened by the cushioning means provided at the opposite end, thereby not only preventing breakage of said stop, but also doing away with the pounding and rattling noise produced by stops mounted at or near the ends of valve stems; furthermore than that, the oscillating and twisting tendency and the angular movement of the free end of valve stems of the kind last referred to and which results in a jamming and lateral sticking or binding action of the valve stem in its bearings or guides, is thereby entirely overcome, so as to insure an absolutely axial movement of the regulating part which is the vital part of the operating tool.

Having thus described my invention, I claim:—

1. In a fluid pressure operating device the combination with open-ended fluid conducting means in axial alinement and in spaced relation with each other and a by-pass conduit connecting said conducting means and a reciprocating valve rod intermediate said conducting means and in axial alinement therewith, of a casing surrounding said valve rod, adjustable abutting means on said valve rod, abutting means at one end of said casing and integral therewith, an encircling spring between said abutting means, and near one end of said valve rod, a substantially cup shaped plunger at the other end of said valve rod, pin-and-slot motion limiting means intermediate the plunger and said adjustable abutting means.

2. In a fluid-pressure tool-operating device the combination with open-ended fluid conducting means in axial alinement and in spaced relation with each other, and a by-pass conduit connecting said conducting means, and a reciprocatory valve rod intermediate said conducting means and in axial alinement therewith, of a casing surrounding said valve rod, a plunger having a cylindrical open-ended depression at one end of said valve rod, a valve at the other end of said valve rod, an abutment on said casing adjacent said valve, an adjustable substantially cylindrical abutment on said valve rod intermediate the plunger and said valve and fitting the cavity of said casing, an encircling spring between said abutments, and motion-limiting means intermediate the adjustable abutment and the plunger.

3. In a fluid-pressure tool-operating device the combination with two open-ended fluid conducting means in axial alinement and in spaced relation with each other, a by-pass conduit connecting said conducting means, and a reciprocatory valve rod intermediate said conducting means and in axial alinement therewith, of a casing substantially surrounding said valve rod, a valve at one end of said valve rod opposite one of the fluid conducting means, a plunger at the other end of said valve rod opposite the other fluid conducting means, an adjustable abutment on said valve rod intermediate the plunger and the valve, an abutment on said casing adjacent said valve, spring acting means between said abutments, a venting handle connected to the fluid conducting means opposite the plunger, a source of fluid pressure connected to said venting handle, and a tool connected to the other fluid conducting means.

4. In a fluid-pressure tool operating device as specified in claim 2, venting means connected to the fluid conducting means opposite, a source of fluid pressure connected to said venting handle, a tool, operatively connected to the other fluid conducting means.

5. In a fluid pressure tool operating device the combination with open-ended fluid conducting means in axial alinement and in spaced relation with each other and a by-pass conduit connecting said conducting means, a reciprocatory valve rod intermediate said conducting means and in axial alinement therewith, of a casing substantially surrounding said valve rod, a valve at one end of said valve rod opposite one of the fluid conducting means, a plunger at the other end of said valve rod opposite the other fluid conducting means, an adjustable abutment on said valve rod intermediate the plunger and the valve, an abutment on said casing adjacent the valve, spring acting means between said abutments, venting means connected to the fluid conducting means opposite the plunger, a source of fluid pressure connected to said venting means, and a tool operatively connected to the fluid conducting means opposite the valve.

6. In a fluid pressure tool-operating device the combination with open-ended fluid conducting means in axial alinement and in spaced relation with each other, a by-pass conduit connecting said conducting means, and a reciprocatory valve rod intermediate said conducting means and in axial alinement therewith, of a casing substantially surrounding said valve rod, a plunger having a cylindrical open-ended depression at one end of said valve rod, a valve at the other end of said valve rod, an abutment on said casing adjacent said valve, and adjustable substantially cylindrical abutting means on said valve rod intermediate the plunger and said valve and fitting the cavity of said casing spring-acting means between said abutments, and normally withdrawing said valve from the opposite fluid conducting means, motion-limiting means intermediate the adjustable abutting means and the plunger, venting means connected to the fluid conducting means opposite the plunger, a source of fluid pressure connected to said venting means, and a tool operatively connected to the fluid conducting means opposite the valve.

7. In a fluid pressure-operating device in combination a casing, a valve rod, reciprocatorily mounted in said casing a cup shaped part at one end of said valve rod, a valve at the other end of said rod, intercommuncating fluid-conducting means, open conduits on said means opposite the valve and the cup-shaped part respectively, means operatively connected to said valve rod, and normally keeping said valve and said cup-shaped part at a distance from said open conduits, motion-limiting means at one end of said cup shaped part a venting handle opposite the other end of said cup shaped part, and a tool operatively connected to said fluid conducting means.

8. In a fluid-pressure tool-operating device in combination, a casing, a valve rod reciprocatorily mounted in said casing, a substantially cup-shaped part at one end of said valve rod, a valve at the other end of said valve rod, intercommunicating fluid-conducting means, open-ended conduits on said means opposite the valve and the cup-shaped part respectively, means operatively connected to said valve rod, and normally keeping said valve and said cup-shaped part at a distance from said open conduits, motion limiting means at one side of said cup shaped part, a venting handle opposite the other side of said cup-shaped part, and a drilling tool operatively connected to said fluid conducting means opposite said valve.

CHARLES C. CHENEY.